United States Patent
Penney et al.

(10) Patent No.: US 10,387,299 B2
(45) Date of Patent: Aug. 20, 2019

(54) APPARATUSES AND METHODS FOR TRANSFERRING DATA

(71) Applicant: Micron Technology, Inc., Boise, ID (US)

(72) Inventors: Daniel B. Penney, Wylie, TX (US); Gary L. Howe, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 17 days.

(21) Appl. No.: 15/214,982

(22) Filed: Jul. 20, 2016

(65) Prior Publication Data

US 2018/0024926 A1  Jan. 25, 2018

(51) Int. Cl.
| | |
|---|---|
| G06F 12/0815 | (2016.01) |
| G06F 12/02 | (2006.01) |
| G06F 12/0855 | (2016.01) |
| G06F 13/16 | (2006.01) |

(52) U.S. Cl.
CPC ...... *G06F 12/0215* (2013.01); *G06F 12/0859* (2013.01); *G06F 13/16* (2013.01); *G06F 2212/1016* (2013.01); *G06F 2212/1028* (2013.01); *Y02D 10/13* (2018.01)

(58) Field of Classification Search
CPC .................. G06F 12/0815; G06F 2212/621
See application file for complete search history.

(56) References Cited

U.S. PATENT DOCUMENTS

| | | |
|---|---|---|
| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

(Continued)

*Primary Examiner* — Ramon A. Mercado
(74) *Attorney, Agent, or Firm* — Brooks, Cameron & Huebsch, PLLC

(57) ABSTRACT

The present disclosure includes apparatuses and methods related to shifting data. An example apparatus comprises a cache coupled to an array of memory cells and a controller. The controller is configured to perform a first operation beginning at a first address to transfer data from the array of memory cells to the cache, and perform a second operation concurrently with the first operation, the second operation beginning at a second address.

25 Claims, 7 Drawing Sheets

(56) References Cited

U.S. PATENT DOCUMENTS

| | | |
|---|---|---|
| 5,253,308 A | 10/1993 | Johnson |
| 5,261,071 A * | 11/1993 | Lyon .................. G06F 9/3834 |
| | | 711/122 |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,982,700 A * | 11/1999 | Proebsting .............. G11C 8/16 |
| | | 365/189.04 |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,216,205 B1 * | 4/2001 | Chin .................. G06F 5/12 |
| | | 365/230.05 |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,941,434 B2 * | 9/2005 | Uneyama ............... G06F 5/14 |
| | | 710/57 |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,692,466 B2 | 4/2010 | Ahmadi |
| 7,685,365 B2 | 5/2010 | Rajwar et al. |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |

(56) References Cited

U.S. PATENT DOCUMENTS

| | | | |
|---|---|---|---|
| 9,165,023 B2 | 10/2015 | Moskovich et al. | |
| 2001/0007112 A1 | 7/2001 | Porterfield | |
| 2001/0008492 A1 | 7/2001 | Higashiho | |
| 2001/0010057 A1 | 7/2001 | Yamada | |
| 2001/0028584 A1 | 10/2001 | Nakayama et al. | |
| 2001/0043089 A1 | 11/2001 | Forbes et al. | |
| 2002/0059355 A1 | 5/2002 | Peleg et al. | |
| 2003/0086328 A1* | 5/2003 | Penney | G11C 7/1018 365/230.06 |
| 2003/0167426 A1 | 9/2003 | Slobodnik | |
| 2003/0222879 A1 | 12/2003 | Lin et al. | |
| 2004/0047209 A1* | 3/2004 | Lien | G11C 7/1075 365/202 |
| 2004/0073592 A1 | 4/2004 | Kim et al. | |
| 2004/0073773 A1 | 4/2004 | Demjanenko | |
| 2004/0085840 A1 | 5/2004 | Vali et al. | |
| 2004/0095826 A1 | 5/2004 | Perner | |
| 2004/0154002 A1 | 8/2004 | Ball et al. | |
| 2004/0205289 A1 | 10/2004 | Srinivasan | |
| 2004/0240251 A1 | 12/2004 | Nozawa et al. | |
| 2005/0015557 A1 | 1/2005 | Wang et al. | |
| 2005/0078514 A1 | 4/2005 | Scheuerlein et al. | |
| 2005/0097417 A1 | 5/2005 | Agrawal et al. | |
| 2006/0047937 A1 | 3/2006 | Selvaggi et al. | |
| 2006/0069849 A1 | 3/2006 | Rudelic | |
| 2006/0146623 A1 | 7/2006 | Mizuno et al. | |
| 2006/0149804 A1 | 7/2006 | Luick et al. | |
| 2006/0181917 A1 | 8/2006 | Kang et al. | |
| 2006/0215432 A1 | 9/2006 | Wickeraad et al. | |
| 2006/0225072 A1 | 10/2006 | Lari et al. | |
| 2006/0291282 A1 | 12/2006 | Liu et al. | |
| 2007/0103986 A1 | 5/2007 | Chen | |
| 2007/0171747 A1 | 7/2007 | Hunter et al. | |
| 2007/0180006 A1 | 8/2007 | Gyoten et al. | |
| 2007/0180184 A1 | 8/2007 | Sakashita et al. | |
| 2007/0195602 A1 | 8/2007 | Fong et al. | |
| 2007/0285131 A1 | 12/2007 | Sohn | |
| 2007/0285979 A1 | 12/2007 | Turner | |
| 2007/0291532 A1 | 12/2007 | Tsuji | |
| 2008/0025073 A1 | 1/2008 | Arsovski | |
| 2008/0037333 A1 | 2/2008 | Kim et al. | |
| 2008/0052711 A1 | 2/2008 | Forin et al. | |
| 2008/0137388 A1 | 6/2008 | Krishnan et al. | |
| 2008/0178053 A1 | 7/2008 | Gorman et al. | |
| 2008/0215937 A1 | 9/2008 | Dreibelbis et al. | |
| 2008/0165601 A1 | 12/2008 | Matick et al. | |
| 2009/0067218 A1 | 3/2009 | Graber | |
| 2009/0154238 A1 | 6/2009 | Lee | |
| 2009/0154273 A1 | 6/2009 | Borot et al. | |
| 2009/0240866 A1* | 9/2009 | Kajigaya | G06F 13/1657 710/317 |
| 2009/0254697 A1 | 10/2009 | Akerib | |
| 2010/0067296 A1 | 3/2010 | Li | |
| 2010/0091582 A1 | 4/2010 | Vali et al. | |
| 2010/0172190 A1 | 7/2010 | Lavi et al. | |
| 2010/0210076 A1 | 8/2010 | Gruber et al. | |
| 2010/0226183 A1 | 9/2010 | Kim | |
| 2010/0308858 A1 | 12/2010 | Noda et al. | |
| 2010/0332895 A1 | 12/2010 | Billing et al. | |
| 2011/0051523 A1 | 3/2011 | Manabe et al. | |
| 2011/0063919 A1 | 3/2011 | Chandrasekhar et al. | |
| 2011/0093662 A1 | 4/2011 | Walker et al. | |
| 2011/0103151 A1 | 5/2011 | Kim et al. | |
| 2011/0119467 A1 | 5/2011 | Cadambi et al. | |
| 2011/0122695 A1 | 5/2011 | Li et al. | |
| 2011/0140741 A1 | 6/2011 | Zerbe et al. | |
| 2011/0219260 A1 | 9/2011 | Nobunaga et al. | |
| 2011/0267883 A1 | 11/2011 | Lee et al. | |
| 2011/0317496 A1 | 12/2011 | Bunce et al. | |
| 2012/0005397 A1 | 1/2012 | Lim et al. | |
| 2012/0017039 A1 | 1/2012 | Margetts | |
| 2012/0023281 A1 | 1/2012 | Kawasaki et al. | |
| 2012/0120705 A1 | 5/2012 | Mitsubori et al. | |
| 2012/0134216 A1 | 5/2012 | Singh | |
| 2012/0134226 A1 | 5/2012 | Chow | |
| 2012/0135225 A1 | 5/2012 | Chow | |
| 2012/0140540 A1 | 6/2012 | Agam et al. | |
| 2012/0182798 A1 | 7/2012 | Hosono et al. | |
| 2012/0195146 A1 | 8/2012 | Jun et al. | |
| 2012/0198310 A1 | 8/2012 | Tran et al. | |
| 2012/0246380 A1 | 9/2012 | Akerib et al. | |
| 2012/0265964 A1 | 10/2012 | Murata et al. | |
| 2012/0281486 A1 | 11/2012 | Rao et al. | |
| 2012/0303627 A1 | 11/2012 | Keeton et al. | |
| 2013/0003467 A1 | 1/2013 | Klein | |
| 2013/0061006 A1 | 3/2013 | Hein | |
| 2013/0073803 A1* | 3/2013 | Huber | G11C 7/1045 711/104 |
| 2013/0107623 A1 | 5/2013 | Kavalipurapu et al. | |
| 2013/0117541 A1 | 5/2013 | Choquette et al. | |
| 2013/0124783 A1 | 5/2013 | Yoon et al. | |
| 2013/0132702 A1 | 5/2013 | Patel et al. | |
| 2013/0138646 A1 | 5/2013 | Sirer et al. | |
| 2013/0163362 A1 | 6/2013 | Kim | |
| 2013/0173888 A1 | 7/2013 | Hansen et al. | |
| 2013/0205114 A1 | 8/2013 | Badam et al. | |
| 2013/0219112 A1 | 8/2013 | Okin et al. | |
| 2013/0227361 A1 | 8/2013 | Bowers et al. | |
| 2013/0283122 A1 | 10/2013 | Anholt et al. | |
| 2013/0286705 A1 | 10/2013 | Grover et al. | |
| 2013/0326154 A1 | 12/2013 | Haswell | |
| 2013/0332707 A1 | 12/2013 | Gueron et al. | |
| 2014/0185395 A1 | 7/2014 | Sec | |
| 2014/0215185 A1 | 7/2014 | Danielsen | |
| 2014/0250279 A1 | 9/2014 | Manning | |
| 2014/0277590 A1* | 9/2014 | Brown | G06F 9/4498 700/3 |
| 2014/0344934 A1 | 11/2014 | Jorgensen | |
| 2015/0029798 A1 | 1/2015 | Manning | |
| 2015/0042380 A1 | 2/2015 | Manning | |
| 2015/0063052 A1 | 3/2015 | Manning | |
| 2015/0078108 A1 | 3/2015 | Cowles et al. | |
| 2015/0279466 A1 | 3/2015 | Manning | |
| 2015/0098285 A1* | 4/2015 | Huber | G11C 7/02 365/198 |
| 2015/0120987 A1 | 4/2015 | Wheeler | |
| 2015/0134713 A1 | 5/2015 | Wheeler | |
| 2015/0270015 A1 | 9/2015 | Murphy et al. | |
| 2015/0324290 A1 | 11/2015 | Leidel | |
| 2015/0325272 A1 | 11/2015 | Murphy | |
| 2015/0356009 A1 | 12/2015 | Wheeler et al. | |
| 2015/0356022 A1 | 12/2015 | Leidel et al. | |
| 2015/0357007 A1 | 12/2015 | Manning et al. | |
| 2015/0357008 A1 | 12/2015 | Manning et al. | |
| 2015/0357019 A1 | 12/2015 | Wheeler et al. | |
| 2015/0357020 A1 | 12/2015 | Manning | |
| 2015/0357021 A1 | 12/2015 | Hush | |
| 2015/0357022 A1 | 12/2015 | Hush | |
| 2015/0357023 A1 | 12/2015 | Hush | |
| 2015/0357024 A1 | 12/2015 | Hush et al. | |
| 2015/0357047 A1 | 12/2015 | Tiwari | |
| 2016/0062672 A1 | 3/2016 | Wheeler | |
| 2016/0062673 A1 | 3/2016 | Tiwari | |
| 2016/0062692 A1 | 3/2016 | Finkbeiner et al. | |
| 2016/0062733 A1 | 3/2016 | Tiwari | |
| 2016/0063284 A1 | 3/2016 | Tiwari | |
| 2016/0064045 A1 | 3/2016 | La Fratta | |
| 2016/0064047 A1 | 3/2016 | Tiwari | |
| 2016/0098208 A1 | 4/2016 | Willcock | |
| 2016/0098209 A1 | 4/2016 | Leidel et al. | |
| 2016/0110135 A1 | 4/2016 | Wheeler et al. | |
| 2016/0125919 A1 | 5/2016 | Hush | |
| 2016/0154596 A1 | 6/2016 | Willcock et al. | |
| 2016/0155482 A1 | 6/2016 | La Fratta | |
| 2016/0188250 A1 | 6/2016 | Wheeler | |
| 2016/0196142 A1 | 7/2016 | Wheeler et al. | |
| 2016/0196856 A1 | 7/2016 | Tiwari et al. | |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |

(56) References Cited

FOREIGN PATENT DOCUMENTS

| KR | 10-2010-0134235 | 12/2010 |
|---|---|---|
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

\* cited by examiner

US 10,387,299 B2

APPARATUSES AND METHODS FOR TRANSFERRING DATA

TECHNICAL FIELD

The present disclosure relates generally to semiconductor memory and methods, and more particularly, to apparatuses and methods related to transferring data.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can comprise a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., inversion) logical operations on data (e.g., one or more operands). For example, functional unit circuitry may be used to perform arithmetic operations such as addition, subtraction, multiplication, and division on operands via a number of logical operations.

A number of components in a computing system may be involved in providing instructions to the functional unit circuitry for execution. The instructions may be executed, for instance, by a processing resource such as a controller and/or host processor. Data (e.g., the operands on which the instructions will be executed) may be stored in a memory array that is accessible by the functional unit circuitry. The instructions and data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the instructions and data may also be sequenced and/or buffered.

In many instances, the processing resources (e.g., processor and/or associated functional unit circuitry) may be external to the memory array, and data is accessed via a bus between the processing resources and the memory array to execute a set of instructions. Processing performance may be improved in a bit vector operation device (e.g., a processing-in-memory (PIM) device), in which a processing resource may be implemented internal and/or near to a memory (e.g., directly on a same chip as the memory array). A bit vector operation device may reduce time in processing and may also conserve power. Data movement between and within arrays and/or subarrays of various memory devices, such as bit vector operation devices, can affect processing time and/or power consumption.

DETAILED DESCRIPTION

Figure 1:
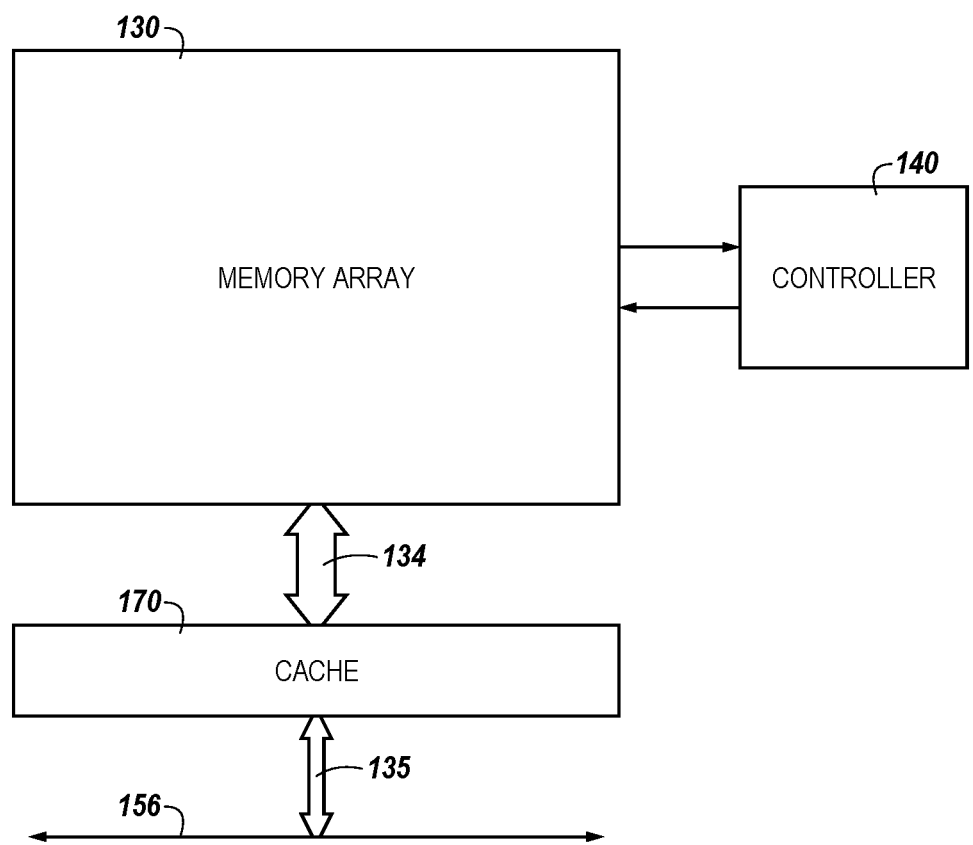
FIG. 1 is a block diagram of an apparatus including a memory array and a cache in accordance with a number of embodiments of the present disclosure.

The present disclosure includes apparatuses and methods related to transferring data. An example apparatus comprises a cache coupled to an array of memory cells and a controller. The controller is configured to perform a first operation beginning at a first address to transfer data from the array of memory cells to the cache, and perform a second operation concurrently with the first operation, the second operation beginning at a second address.

In some approaches to transferring data, data may be transferred from a memory array (e.g., an array of memory cells) to a cache. The data may be transferred from the memory array on a column-by-column basis until either the cache is full, or until all the data in the memory array has been transferred to the cache. Once the cache is full or all the intended data has been transferred from the memory array to the cache, data may begin to be transferred from the cache to a different location, for example, to a data bus and/or a host (e.g., to DQ pins associated with a host).

For example, a cache may be provided between a memory array (e.g., an array of memory cells) and an external data path. The external data path may include a path by which data may be transferred to a different location. In some embodiments, prior to transferring data from a memory array to the different location, the data may be transferred from the memory array to a cache. The cache may be an input/output (I/O) cache. Transferring data between the memory array and the cache may take multiple memory array column cycles, which may effectively increase a latency associated with performing an operation on the data as the cache is filled.

In contrast, in some embodiments, data may be transferred from the cache to a different location (e.g., a host, data bus, etc.) concurrently with data being transferred to the cache. For example, in some embodiments, a starting address (e.g., a starting memory array column address) may be known and/or selected. This can allow for subsequent operations (e.g., read, write, transfer operations, etc.) on the data to begin as soon as a previous operation (e.g., as soon as the data for the memory array column associated with the starting address has been transferred to the cache) has completed. Similarly, this can allow for operations on the data to begin as soon as the data from DQ(s) associated with the host has been transferred to the cache. In some embodiments, data that has been transferred to the cache may be read from the cache concurrently with data from other columns of the memory array (or other DQ(s)) being transferred to the cache. This may lead to a reduction in a row address to column address delay (tRCD). As discussed in more detail herein, information regarding the starting address may be provided from a mode register setting, latched with an external command, or provided in some other suitable manner.

In some embodiments, data pipelining techniques can be used in a memory device to reduce transfer times associated with moving data between a host and a memory array associated with the memory device. As used herein, "data pipelining" consists of performing operations on data between various locations of a memory device in parallel, in a time-sliced fashion, and/or while allowing overlapping execution of operations. For example, data pipelining includes accepting a command to perform a subsequent operation prior to completion of a previous operation.

Further, in some approaches, at least some circuitry of a processing resource(s) of some systems may not conform to pitch rules associated with a memory array. For example, the memory cells of a memory array may have a $4F^2$ or $6F^2$ cell size. As such, the devices (e.g., logic gates) associated with ALU circuitry of previous systems may not be capable of being formed on pitch with the memory cells (e.g., on a same pitch as the sense lines), which can affect chip size and/or memory density, for example. In the context of some computing systems and subsystems (e.g., a central processing unit (CPU)), data may be processed in a location that is not on pitch and/or on chip with memory (e.g., memory cells in the array), as described herein. The data may be processed by a processing resource associated with a host, for instance, rather than on pitch with the memory.

In contrast, a number of embodiments of the present disclosure can include the sensing circuitry 450 (e.g., including sense amplifiers and/or compute components) and/or cache 470 being formed on pitch with the memory cells of the array. The sensing circuitry 450 can be configured for (e.g., capable of) performing logical operations. A number of embodiments of the present disclosure include sensing circuitry formed on pitch with memory cells of the array and capable of performing logical functions such as those described herein below.

For example, the sensing circuitry 450 and/or cache 470, described herein can be formed on a same pitch as a pair of complementary sense lines. As an example, a pair of complementary memory cells may have a cell size with a $6F^2$ pitch (e.g., 3F×2F). If the pitch of a pair of complementary sense lines for the complementary memory cells is 3F, then the sensing circuitry being on pitch indicates the sensing circuitry (e.g., a sense amplifier and corresponding compute component per respective pair of complementary sense lines) is formed to fit within the 3F pitch of the complementary sense lines.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, designators such as "n", particularly with respect to reference numerals in the drawings, indicate that a number of the particular feature so designated can be included. As used herein, "a number of" a particular thing refers to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 150 may reference element "50" in FIG. 1, and a similar element may be referenced as 250 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus including a memory array and a cache in accordance with a number of embodiments of the present disclosure. The memory array 130 can correspond to memory array 430 in FIG. 4A, and the cache 170 can correspond to cache 470 in FIG. 4A. As illustrated in FIG. 1, memory array 130 is coupled to cache 170 such that data stored in memory array 130 may be transferred as indicated by arrow 134 to the cache 170, and data stored in the cache 170 may be transferred as indicated by arrow 134 to the memory array 130. Cache 170 is coupled to data bus 156 such that data stored in cache 170 may be transferred as indicated by arrow 135 to the data bus 156, and data may be received to the cache 170 as indicated by arrow 135 via the data bus 156. For example, data received to DQs associated with the data bus 156 or from the host (for example, host 410, illustrated in FIG. 4A) may be transferred via data bus 156 to cache 170.

In some embodiments, a transfer rate associated with transferring data between the memory array 130 and the cache 170, as indicated by arrow 134, may be different than a transfer rate associated with transferring data between the cache 170 and the data bus 156. For example, transferring data between the memory array 130 and the cache 170 may have a first transfer rate associated therewith, and transferring data between the cache 170 and the data bus 156 may have a second transfer rate associated therewith. In a non-limiting example, in some embodiments, the transfer rate associated with transferring data between the memory array 130 and the cache 170 may be 2048 bits per cycle, and the transfer rate associated with transferring the data between the cache 170 and the data bus 156 may be 512 bits. However, as will be appreciated, data may be transferred between the memory array 130 and the cache 170, and between the cache 170 and the data bus 156 at other rates.

In an example where data is transferred between the memory array 130 and the cache 170 at a transfer rate of 2048 bits per cycle, all the data stored in the memory array 130 may be transferred to the cache 170 in eight data transfers. For example, if there are around 16,000 bits to be transferred to the cache 170, and the data is transferred in 2048 bit chunks, it may take eight data transfers to transfer all 16,000 bits to the cache 170. In this example, the data transfer rate is around eight clock cycle time (tCK), and it may take around 64 tCK to fill the cache 170 if the cache 170 contains around 16,000 bits. In some embodiments, data from a column select array (CSA) of the memory array 130 may be transferred to a column select cache (CSC) of the cache 170, as discussed in more detail in connection with FIG. 3, herein. In some embodiments, data from the memory array 130 can be transferred to the cache 170 from a particular CSA associated with the memory array 130 to a particular CSC associated with the cache 170. For example, data may be transferred from CSA<n> of the memory array 130 to CSC<n> of the cache 170. In some embodiments, data may be transferred between the memory array 130 and the cache 170 starting at a first address (e.g., a first column address location), and may proceed sequentially column address by column address until the data has all been transferred.

In some embodiments, data can be transferred between the cache 170 and the data bus 156 at a rate of 8 bits per DQ associated with the data bus. For example, 512 bits may be transferred from the cache 170 to 64 DQs at a rate of 8 bits per DQ. Embodiments are not so limited; however, and data may be transferred from the cache 170 to the data bus 156 such that 256 bits, 128 bits, etc. are transferred from the cache 170 to the data bus 156.

Figure 2A:
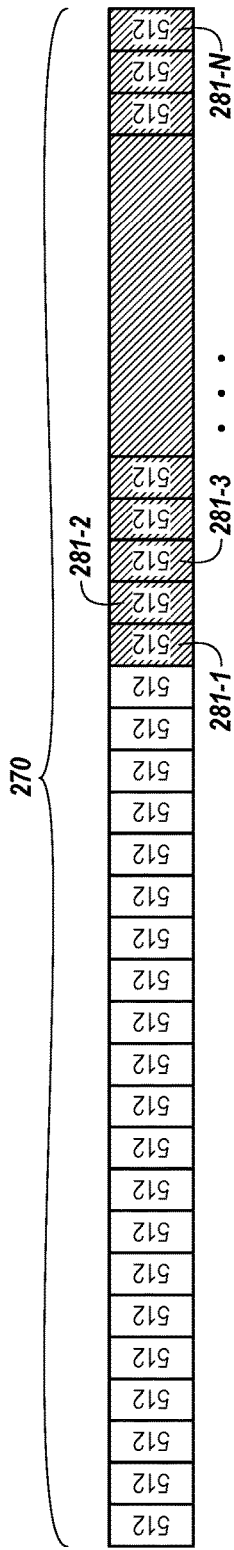
FIGS. 2A-2C are block diagrams illustrating a portion of a cache in accordance with a number of embodiments of the present disclosure.
Figure 2B:
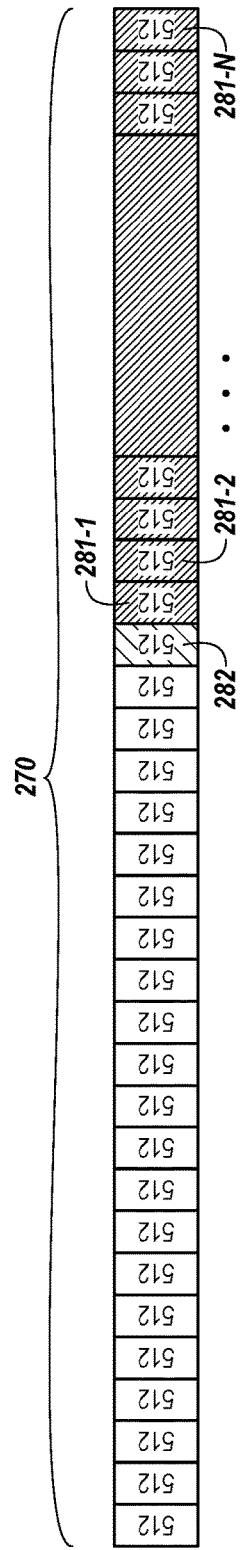
Figure 2C:
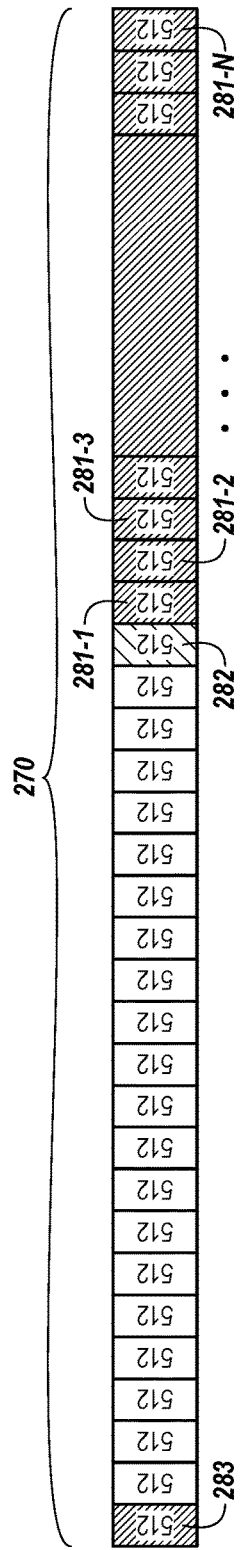

FIGS. 2A-2C are block diagrams illustrating a portion of a cache 270 in accordance with a number of embodiments of the present disclosure. The example cache 270 illustrated in FIGS. 2A-2C includes a plurality of addresses, for example, addresses 281-1, 281-2, 281-3, . . . , 281-N, 282, 283, etc. In the example of FIG. 2A, data may start being transferred to the cache 270 at a first address 281-1. The data being transferred to the cache 270 may be associated with a particular CSA associated with a memory array. In some embodiments, once the data has been transferred to the first address 281-1, additional data may be transferred to a second address 281-2. Additional data may continue to be transferred to the cache 270 sequentially to additional address spaces 281-3, . . . , 281-N.

In some embodiments, after the entire cache 270 has been filled with data transferred from the array 130, the data may be transferred from the cache 270 to DQs associated with the data bus 156. In some embodiments, the data may be transferred from the cache 270 to DQs associated with the data bus 156 starting with a first CSC address. However, a delay associated with filling the entire cache 270 prior to transferring data from the cache 270 to DQs associated with the data bus 156 may be reduced by allowing a CSC address corresponding to a first CSA address to be selectable. For example, in some embodiments, data may be transferred from the array 130 to the cache 270 while data that has already been transferred to the cache 270 is concurrently transferred from the cache 270 to DQs associated with the data bus 156. In some embodiments, the CSC address and/or the first CSA address may be selectable by a user. In this example, read performance may be increased.

In some approaches, a starting CSA address may be selectable by loading an address into the cache 270, for example, with a read command. In contrast, in some embodiments, a starting CSC address in the cache 270 may be selected by using a command (e.g., a read command) including an associated CSC address, or the starting CSC address may be selected by loading the starting CSC address into a mode register.

In some embodiments, depending on a difference in transfer speeds from the DQs to the cache 270 and from the cache 270 to the array 130, a minimum amount of data may be written from the cache 270 to the array 130 before execution of a read plus retrieve command that initiates concurrent data transfer from the cache 270 to the DQs. In some embodiments, allowing a minimum amount of data to be written from the cache 270 to the array 130 before initiating concurrent data transfer between the cache 270 to the DQs may reduce the chance that the cache 270 is overrun during the concurrent data transfer operation.

In some embodiments, the cache 270 may be configured to perform concurrent write operations. In this example, write performance may be increased. For example, if data from the DQs is written to the cache 270 beginning with address 281-1, as illustrated in FIG. 2A, then a write plus commit command may be executed to write data to an adjacent address 282 (e.g., a prior CSC address), as illustrated in FIG. 2B. In some embodiments, this may cause the transfer of write data from the cache 270 to the array 130 to begin at adjacent address 282, and to continue sequentially to address 281-1, then to address 281-2, and so forth while data is concurrently written from the DQs to addresses that are located later sequentially in the cache 270.

As illustrated in FIG. 2C, when a last address 281-N of the cache 270 has been written with write data from the DQs associated with data bus 156, the process may continue as the address location "wraps" from the last address 281-N of the cache 270 to a first address 283 of the cache 270. In some embodiments, depending on a difference in transfer speeds from the DQs to the cache 270 and from the cache 270 to the array 130, a minimum amount of data may be written to the cache 270 from the DQs prior to executing a commit command that initiates concurrent data transfer from the cache 270 to the array 130. In some embodiments, allowing a minimum amount of data to be written from the cache 270 to the DQs before initiating a concurrent write operation between the cache 270 and the array 130 may reduce the chance that the cache 270 is overrun during the concurrent write operation.

Figure 3:
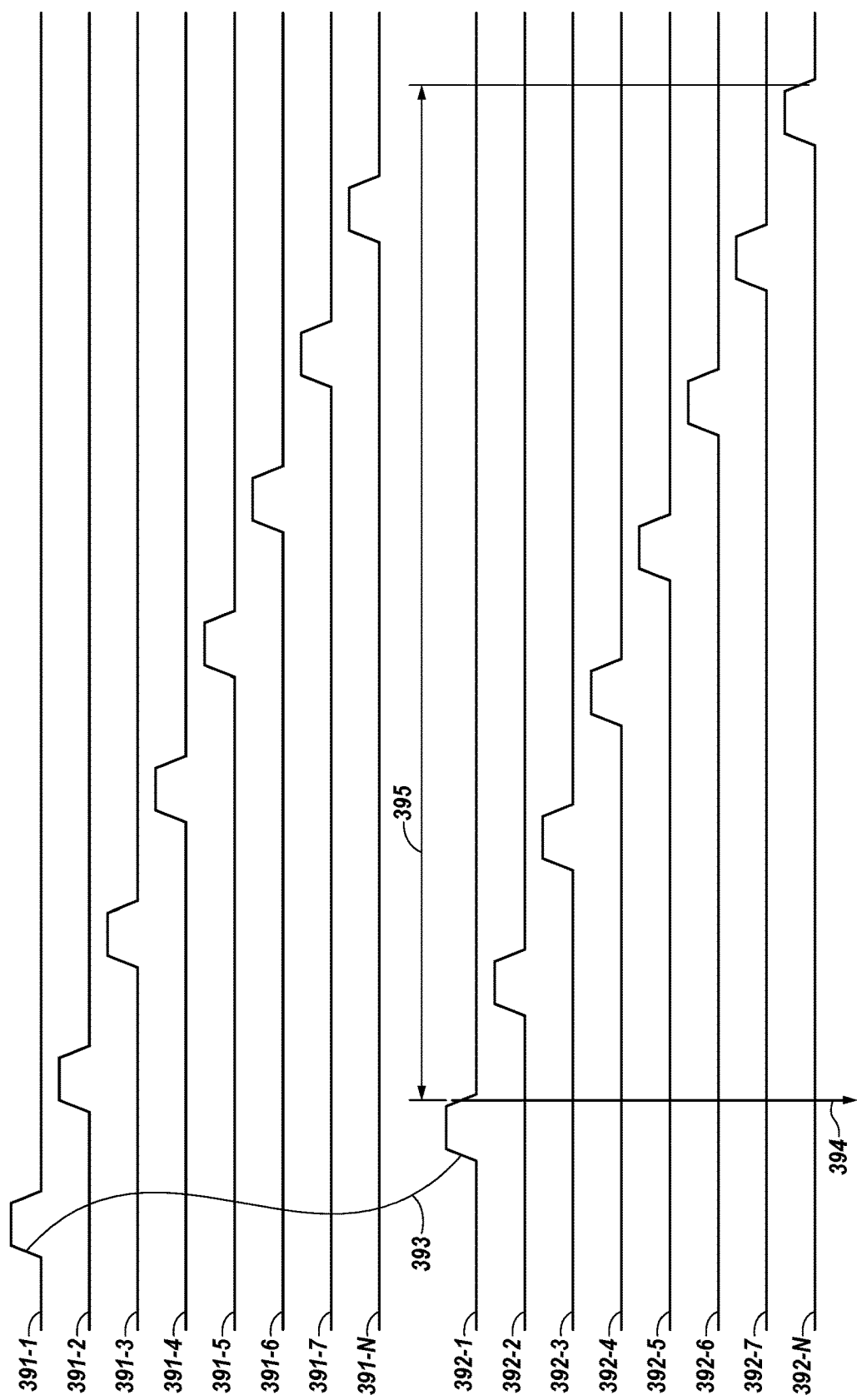
FIG. 3 is a timing diagram illustrating a number of timing cycles associated with transferring data according to the disclosure.

FIG. 3 is a timing diagram illustrating a number of timing cycles associated with transferring data according to the disclosure. The timing cycles shown in the upper portion of FIG. 3 may correspond to timing cycles associated with column select arrays (CSAs) of a memory array. For example, CSA 391-1 can be a first CSA, CSA 391-2 can be a second CSA, and so forth, with CSA 391-N corresponding to an $n^{th}$ CSA. In some embodiments, as illustrated in FIG. 3, there may be 8 CSAs, each corresponding to 2048 bits of data associated with a particular column of a memory array.

The timing cycles shown in the lower portion of FIG. 3 may correspond to timing cycles associated with column select caches (CSCs) of a cache. For example, CSC 392-1 can be a first CSC, CSC 392-2 can be a second CSC, and so forth, with CSC 392-N corresponding to an $n^{th}$ CSC.

As illustrated in FIG. 3, according to some approaches in which a cache is filled before data is transferred from the cache to a different location, a first data transfer from the cache may not occur until all the data from the memory array has been transferred to the cache, as indicated by arrow 395. In contrast, embodiments of the present disclosure allow for data to be transferred from the cache to a different location as soon data associated with a particular CSA (e.g., CSA 391-1) has been transferred to the cache, as indicated by arrow 394. Similarly, data associated with CSC 392-2 may be transferred from the cache to a different location as soon as the data associated with CSA 391-2 has been transferred from the memory array to the cache, and so forth.

Figure 4A:
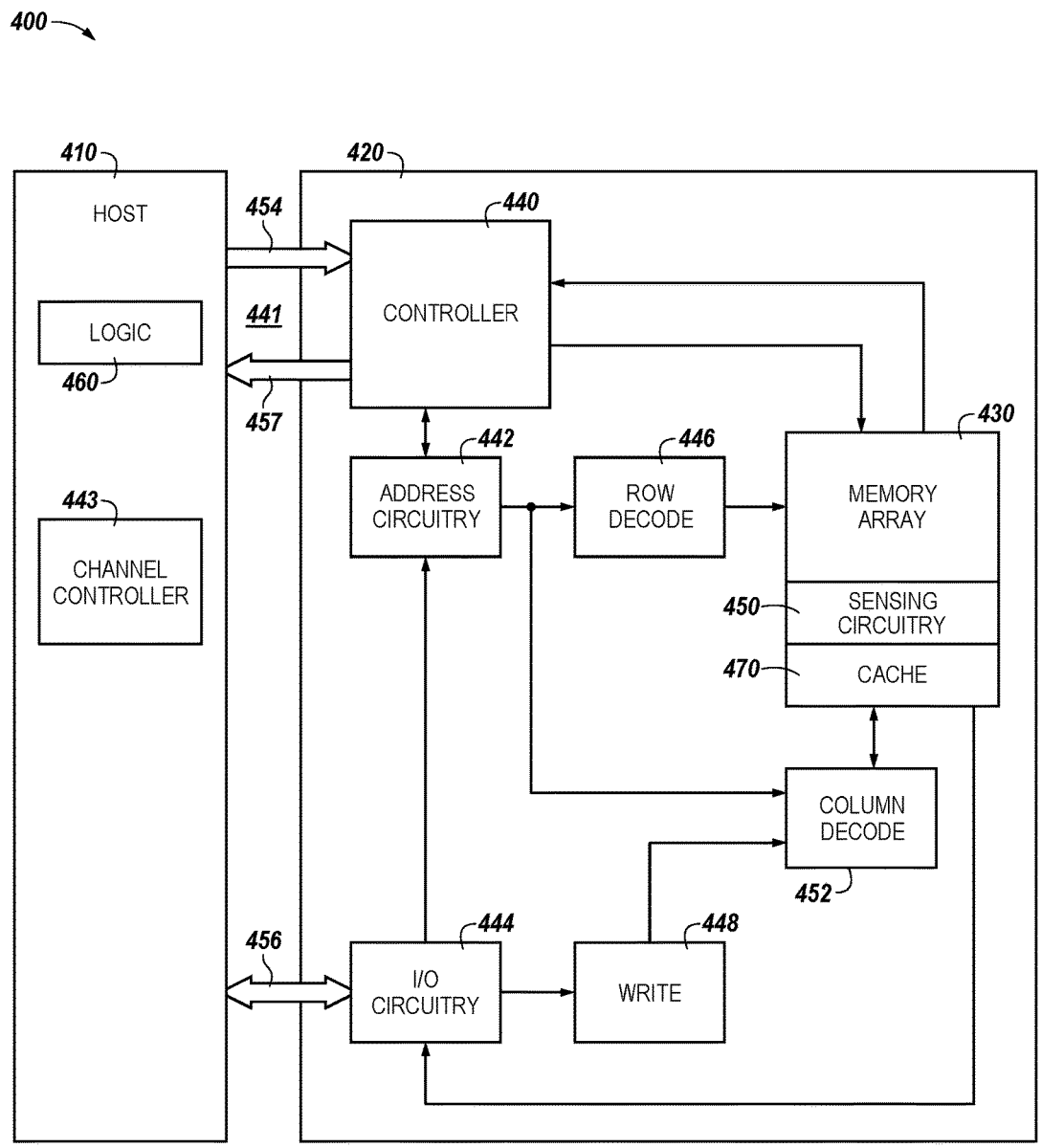
FIG. 4A is a block diagram of an apparatus in the form of a computing system including a memory device in accordance with a number of embodiments of the present disclosure.

FIG. 4A is a block diagram of an apparatus in the form of a computing system 400 including a memory device 420 in accordance with a number of embodiments of the present disclosure. As used herein, a memory device 420, controller 440, channel controller 443, memory array 430, sensing circuitry 450, and/or a cache 470 might also be separately considered an "apparatus."

Figure 4B:
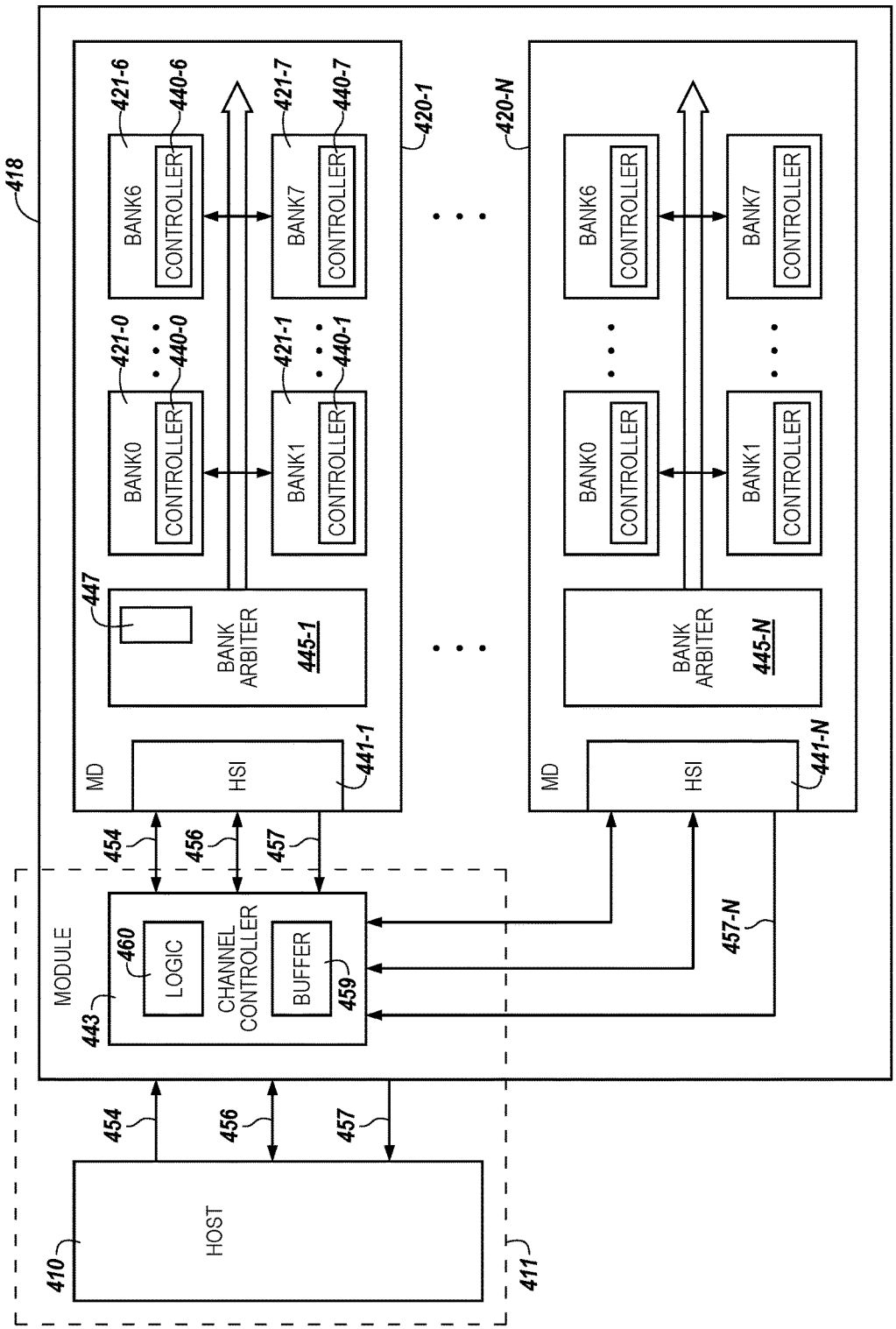
FIG. 4B is another block diagram of an apparatus in the form of a computing system including a memory device in accordance with a number of embodiments of the present disclosure.
Figure 5:
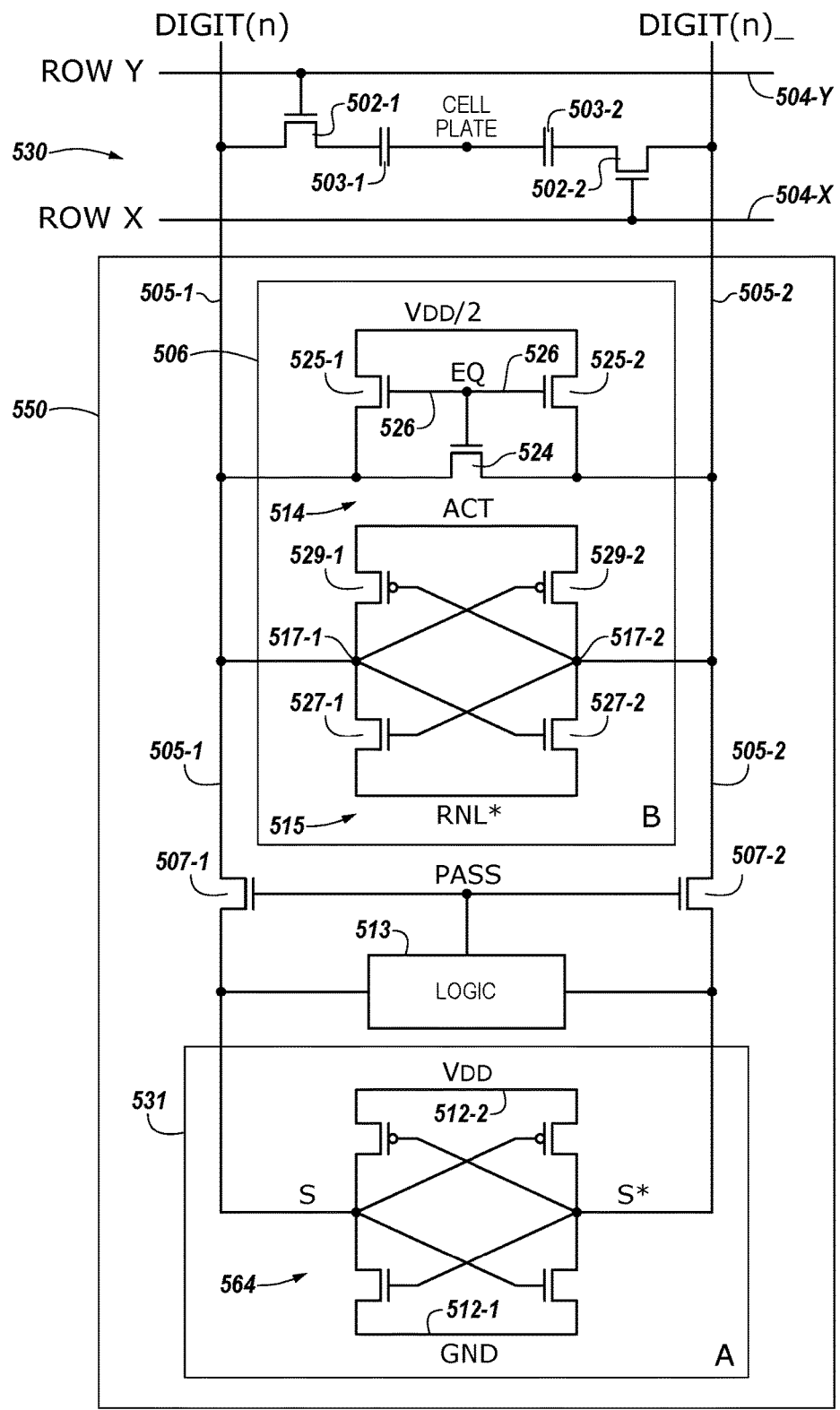
FIG. 5 is a schematic diagram of a portion of a memory array including sensing circuitry in accordance with a number of embodiments of the present disclosure.
Figure 6:
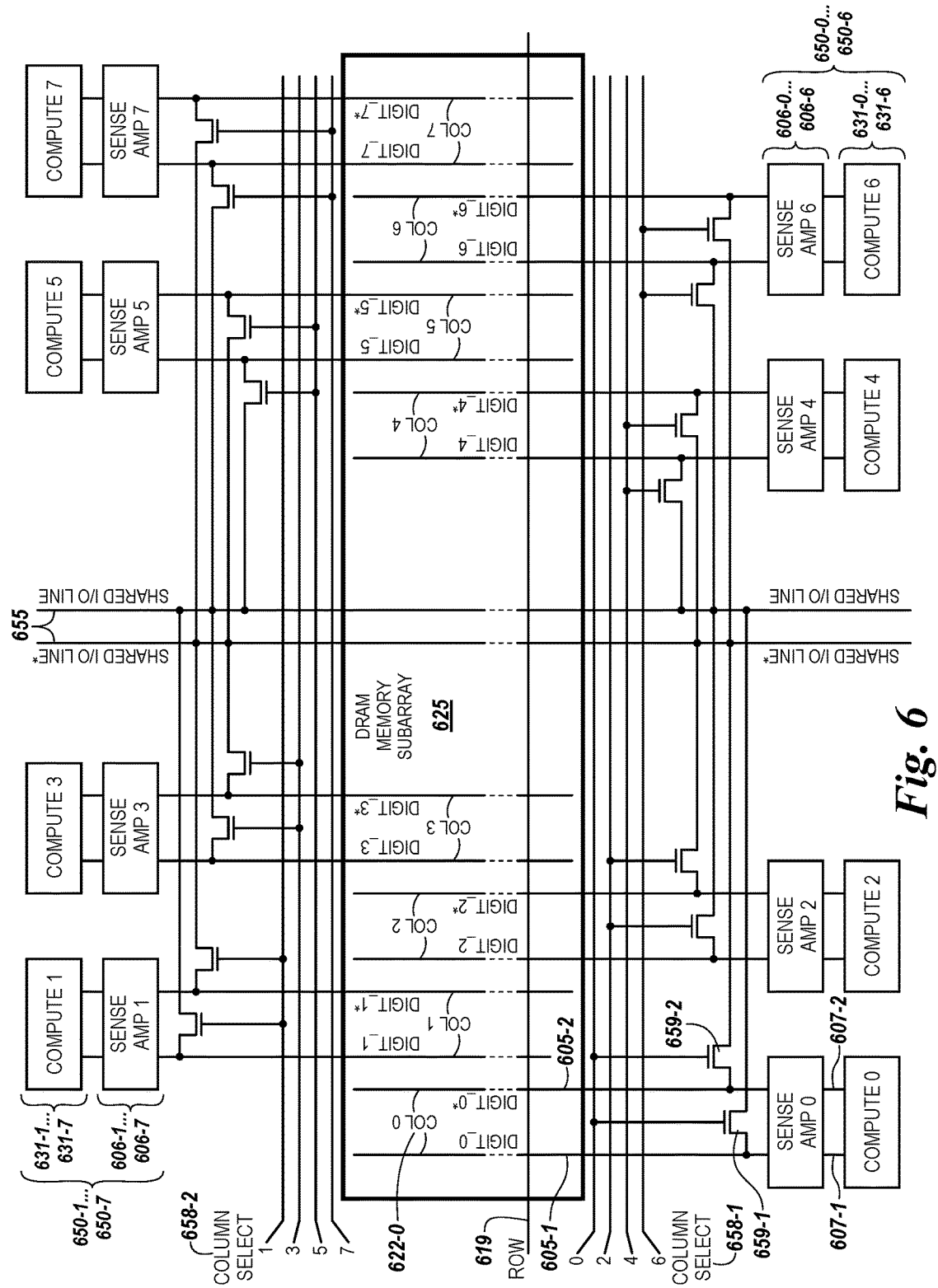
FIG. 6 is a schematic diagram illustrating sensing circuitry in accordance with a number of embodiments of the present disclosure.

As used herein, the cache 470 may provide additional functionalities (e.g., peripheral amplifiers) that sense (e.g., read, store, etc.) data values of memory cells in an array and that are distinct from the sense amplifiers of the sensing component stripes described herein (e.g., as shown at 506 in FIG. 5 and at corresponding reference number in FIG. 6). In some embodiments, latches of the cache 470 can be located on a periphery of a bank 421 of the memory device, as shown FIG. 4B. In contrast, the sense amplifiers located in a plurality of sensing component stripes are physically associated with each subarray of memory cells in a bank 421, as illustrated in FIG. 4B.

System 400 in FIG. 4A includes the host 410 coupled (e.g., connected) to memory device 420, which includes a memory array 430. Host 410 can be a host system such as a personal laptop computer, a desktop computer, a digital camera, a smart phone, or a memory card reader, among various other types of hosts. Host 410 can include a system motherboard and/or backplane and can include a number of processing resources (e.g., one or more processors, microprocessors, or some other type of controlling circuitry). The system 400 can include separate integrated circuits or both the host 410 and the memory device 420 can be on the same integrated circuit. The system 400 can be, for instance, a server system and/or a high performance computing (HPC) system and/or a portion thereof. Although the examples shown in FIGS. 4A-4B illustrate a system having a Von Neumann architecture, embodiments of the present disclosure can be implemented in non-Von Neumann architectures, which may not include one or more components (e.g., CPU, ALU, etc.) often associated with a Von Neumann architecture.

For clarity, the system 400 has been simplified to focus on features with particular relevance to the present disclosure. The memory array 430 can be a DRAM array, SRAM array, STT RAM array, PCRAM array, TRAM array, RRAM array, NAND flash array, and/or NOR flash array, among other types of arrays. The array 430 can include memory cells arranged in rows coupled by access lines (which may be referred to herein as word lines or select lines) and columns coupled by sense lines (which may be referred to herein as data lines or digit lines). Although a single array 430 is shown in FIG. 4A, embodiments are not so limited. For instance, memory device 420 may include a number of arrays 430 (e.g., a number of banks of DRAM cells, NAND flash cells, etc.).

The memory device 420 can include address circuitry 442 to latch address signals provided over a combined data/address bus 456 (e.g., an I/O bus connected to the host 410) by I/O circuitry 444 (e.g., provided to external ALU circuitry and/or to DRAM DQs via local I/O lines and global I/O lines). As used herein, DRAM DQs can enable input of data to and/or output of data from a bank (e.g., from and/or to the controller 440 and/or host 410) via a bus (e.g., data bus 456). During a write operation, a voltage (high=1, low=0) can be applied to a DQ (e.g., a pin). This voltage can be translated into an appropriate signal and stored in a selected memory cell. During a read operation, a data value read from a selected memory cell can appear at the DQ once access is complete and the output enable signal is asserted (e.g., by the output enable signal being low). At other times, DQs can be in a high impedance state, such that the DQs do not source or sink current and do not present a signal to the system. This also may reduce DQ contention when two or more devices (e.g., banks) share a combined data/address bus, as described herein.

Status and exception information can be provided from the controller 440 of the memory device 420 to a channel controller 443, for example, through a an out-of-band (OOB) bus 457, which in turn can be provided from the channel controller 443 to the host 410. The channel controller 443 can be coupled to a logic component 460 to allocate a plurality of locations (e.g., controllers for subarrays) in the arrays of each respective bank to store bank commands, application instructions (e.g., for sequences of operations), and arguments (bit vector operation commands) for the various banks associated with operations of each of a plurality of memory devices (e.g., 420-1, . . . , 420-N as shown in FIG. 4B). The channel controller 443 can dispatch commands (e.g., bit vector operation commands) to the plurality of memory devices 420-1, . . . , 420-N to store those program instructions within a given bank of a memory device.

Address signals are received through address circuitry 442 and decoded by a row decoder 446 and a column decoder 452 to access the memory array 430. Data can be sensed (read) from memory array 430 by sensing voltage and/or current changes on sense lines (digit lines) using a number of sense amplifiers, as described herein, of the sensing circuitry 450. A sense amplifier can read and latch a page (e.g., a row) of data from the memory array 430. Additional compute circuitry, as described herein, can be coupled to the sensing circuitry 450 and can be used in combination with the sense amplifiers to sense, store (e.g., cache and/or buffer), perform compute functions (e.g., operations), and/or move data. The I/O circuitry 444 can be used for bi-directional data communication with host 410 over the data bus 456. In some embodiments, data bus 456 can comprise a 64 bit wide data bus. The write circuitry 448 can be used to write data to the memory array 430.

Controller 440 (e.g., bank control processing unit) can decode signals (e.g., commands) provided by control bus 454 from the host 410. These signals can include chip enable signals, write enable signals, and/or address latch signals that can be used to control operations performed on the memory array 430, including data sense, data store, data movement (e.g., copying, transferring, and/or transporting data values), data write, and/or data erase operations, among other operations. In various embodiments, the controller 440 can be responsible for executing instructions from the host 410 and accessing the memory array 430. The controller 440 can be a state machine, a sequencer, or some other type of controller. The controller 440 can be configured to perform a first operation beginning at a first address to transfer data from the array of memory cells (e.g., memory array 430) to the cache (e.g., cache 470) and/or perform a second operation concurrently with the first operation, the second operation beginning at a second address.

Examples of the sensing circuitry 450 are described further below (e.g., in FIGS. 5 and 6). For instance, in a number of embodiments, the sensing circuitry 450 can include a number of sense amplifiers and a number of compute components, which may serve as an accumulator and can be used to perform operations in each subarray, for example, on data associated with complementary sense lines.

In a number of embodiments, the sensing circuitry 450 can be used to perform operations using data stored in memory array 430 as inputs and participate in movement of the data for copy, transfer, writing, logic, and/or storage operations to a different location in the memory array 430 without transferring the data via a sense line address access (e.g., without firing a column decode signal). As such, various compute functions can be performed using, and within, sensing circuitry 450 rather than (or in association with) being performed by processing resources external to the sensing circuitry 450 (e.g., by a processor associated with host 410 and/or other processing circuitry, such as ALU circuitry, located on device 420, such as on controller 440 or elsewhere).

In various previous approaches, data associated with an operand, for instance, would be read from memory via sensing circuitry and provided to external ALU circuitry via I/O lines (e.g., via local I/O lines and/or global I/O lines) and/or an external data bus (e.g., data bus 456 in FIG. 4A). The external ALU circuitry could include a number of registers and would perform compute functions using the operands, and the result would be transferred back to the array via the I/O lines. In contrast, in a number of embodiments of the present disclosure, sensing circuitry 450 is configured to perform operations on data stored in memory array 430 and store the result back to the memory array 430 without enabling an I/O line (e.g., a local I/O line) coupled to the sensing circuitry 450. In various embodiments, methods, and apparatuses are provided which can function as a bit vector operation random access memory (RAM) device. In a bit vector operation RAM device operation it is useful to transfer data between banks without using a data bus external to the die.

In some embodiments, the sensing circuitry 450 can be formed on pitch with the memory cells of the array. The cache 470 can include latches, as described herein, and can be coupled to the sensing circuitry 450 via a shared I/O line, but be distinct from the sensing circuitry 450. In various embodiments, methods and apparatuses are provided to achieve internal data movement using a minimum row address strobe to column address strobe (tRCD) delay.

As such, in a number of embodiments, circuitry external to array 430 and sensing circuitry 450 is not needed to perform compute functions as the sensing circuitry 450 can perform the appropriate operations to perform such compute functions without the use of an external processing resource. Therefore, the sensing circuitry 450 may be used to complement or to replace, at least to some extent, such an external processing resource (or at least the bandwidth consumption of such an external processing resource).

However, in a number of embodiments, the sensing circuitry 450 may be used to perform operations (e.g., to execute instructions) in addition to operations performed by an external processing resource (e.g., host 410). For instance, host 410 and/or sensing circuitry 450 may be limited to performing only certain operations and/or a certain number of operations.

Enabling an I/O line can include enabling (e.g., turning on, activating) a transistor having a gate coupled to a decode signal (e.g., a column decode signal) and a source/drain coupled to the I/O line. However, embodiments are not limited to not enabling an I/O line. For instance, in a number of embodiments, the sensing circuitry 450 can be used to perform operations without enabling column decode lines of the array; however, the local I/O line(s) may be enabled in order to transfer a result to a suitable location other than back to the array 430 (e.g., to an external register). Enabling (e.g., firing) a DQ pin can similarly consume significant power and time (e.g., require additional clock cycles (tCK) for data transfers).

FIG. 4B is a block diagram of another apparatus architecture in the form of a computing system 400 including a plurality of memory devices 420-1, . . . , 420-N coupled to a host 410 via a channel controller 443 in accordance with a number of embodiments of the present disclosure. In at least one embodiment, the channel controller 443 may be coupled to and integrated with the plurality of banks of the memory device 420 and/or the channel controller 443 may be coupled to and integrated with the host 410. In some embodiments, the channel controller 443 may be integrated with the host 410, as illustrated by dashed lines 411, e.g., formed on a separate chip from the plurality of memory devices 420-1, . . . , 420-N.

The channel controller 443 can be coupled to each of the plurality of banks of the memory device via an address and control (A/C) bus 454, which in turn can be coupled to the host 410. The channel controller 443 can also be coupled to each of the plurality of banks via a combined data/address bus 456, which in turn can be coupled to the host 410. In addition, the channel controller 443 can be coupled to each of the plurality of banks via an OOB bus 457 associated with the HSI 441, also referred to herein as a status channel interface, which is configured to report status, exception and other data information to the channel controller 443 to exchange with the host 410.

The channel controller 443 can receive the status and exception information from the HSI 441 associated with a bank arbiter 445 associated with each of the plurality of banks. The bank arbiter 445 can sequence and control data movement within the plurality of banks (e.g., Bank zero (0), Bank one (1), . . . , Bank six (6), Bank seven (7), etc., as shown in FIG. 4B). A controller 440 can be associated with each particular bank (e.g., Bank 0, . . . , Bank 7) in a given memory device 420 and can decode signals provided by control bus 454 from the host 410. Each of the plurality of banks can include the controller 440 and other components, including an array of memory cells 430 and sensing circuitry 450, and/or cache 470, etc.

For example, each of the plurality of banks (e.g., in a plurality of memory devices 420-1, 420-2, . . . , 420-N each having a plurality of banks as shown in FIG. 4B) can include address circuitry 442 to latch address signals provided over a portion of a combined data/address bus 456 (e.g., an I/O bus) through I/O circuitry 444. Status and/or exception information can be provided from the controller 440 associated with (e.g., on pitch and/or on chip with) each bank to the channel controller 443, using the OOB bus 457, which in turn can be provided from the plurality of banks to the host 410. For each of the plurality of banks (e.g., Bank 0, . . . , Bank 7) address signals can be received through address circuitry 442 and decoded by a row decoder 446 and a column decoder 452 to access the memory array 430. Data can be read from memory array 430 by sensing voltage and/or current changes on the sense lines using sensing circuitry 450. The sensing circuitry 450 can read and latch a page (e.g., row) of data from the memory array 430. The I/O circuitry 444 can be used for bi-directional data communication with host 410 over the data bus 456. The write circuitry (e.g., write circuitry 448 illustrated in FIG. 4A) is used to write data to the memory array 430 and the OOB bus 457 can be used to report status and/or exception information to the channel controller 443.

In some embodiments, the channel controller 443 can dispatch commands to the plurality of banks (e.g., Bank 0, . . . , Bank 7) and field return results and/or data from such operations. As described herein, the return results and/or data can be returned to the channel controller 443 via the OOB bus 457 associated with the status channel interface on each of the plurality of banks.

As shown in FIG. 4B, the channel controller 443 can receive the status and/or exception information from a HSI 441 (also referred to herein as a status channel interface) associated with a bank arbiter 445 in each of the plurality of memory devices 420-1, . . . , 420-N. In the example of FIG. 4B, each of the plurality of memory devices 420-1, . . . , 420-N can include a bank arbiter 445 to sequence control and data with a plurality of banks (e.g., Bank 0, . . . , Bank 7, etc.). Each of the plurality of banks can include a controller 440 and other components, including an array of memory cells 430 and sensing circuitry 450, cache 470, etc., as described in connection with FIG. 4A.

The channel controller 443 can include one or more local buffers 459 to store program instructions and can include logic 460 to allocate a plurality of locations (e.g., subarrays or portions of subarrays) in the arrays of each respective bank to store bank commands, and arguments (e.g., bit vector operation commands) for the various banks associated with operation of each of the plurality of memory devices 420-1, . . . , 420-N. The channel controller 443 can dispatch commands (e.g., bit vector operation commands) to the plurality of memory devices 420-1, . . . , 420-N to store those program instructions within a given bank of a memory device. These program instructions and bit vector operation commands may need to be moved in a bank to bank data transfer (BBT) within a memory device.

As in FIG. 4A, a controller 440 (e.g., bank control processing unit) associated with any subarray in a particular bank (e.g., Bank 0, . . . , Bank 7, etc.) in a given memory device (e.g., 420-1, . . . , 420-N) can decode signals provided by control bus 454 from the host 410. These signals can include chip enable signals, write enable signals, and/or address latch signals that are used to control operations performed on the memory array 430, including data read, data write, data copy, data movement, and/or data erase operations. In various embodiments, the controller 140 is responsible for executing instructions from the host 410.

FIG. 5 is a schematic diagram illustrating sensing circuitry 550 in accordance with a number of embodiments of the present disclosure. The sensing circuitry 550 can correspond to sensing circuitry 450 shown in FIG. 4A, and the memory array 530 can correspond to memory array 430 shown in FIG. 4A.

A memory cell can include a storage element (e.g., capacitor) and an access device (e.g., transistor). For instance, a first memory cell can include transistor 502-1 and capacitor 503-1, and a second memory cell can include transistor 502-2 and capacitor 503-2, etc. In this embodiment, the memory array 530 is a DRAM array of 1T1C (one transistor one capacitor) memory cells, although other embodiments of configurations can be used (e.g., 2T2C with two transistors and two capacitors per memory cell). In a number of embodiments, the memory cells may be destructive read memory cells (e.g., reading the data stored in the cell destroys the data such that the data originally stored in the cell is refreshed after being read).

The cells of the memory array 530 can be arranged in rows coupled by access (word) lines 504-X (Row X), 204-Y (Row Y), etc., and columns coupled by pairs of complementary sense lines (e.g., digit lines DIGIT(n) and DIGIT (n)_shown in FIG. 5 and DIGIT_0 and DIGIT_0* shown in FIG. 6). The individual sense lines corresponding to each pair of complementary sense lines can also be referred to as digit lines 505-1 for DIGIT (n) and 505-2 for DIGIT (n)_, respectively, or corresponding reference numbers in FIG. 6. Although only one pair of complementary digit lines are shown in FIG. 5, embodiments of the present disclosure are not so limited, and an array of memory cells can include additional columns of memory cells and digit lines (e.g., 4,096, 8,192, 16,384, etc.).

Although rows and columns are illustrated as orthogonally oriented in a plane, embodiments are not so limited. For example, the rows and columns may be oriented relative to each other in any feasible three-dimensional configuration. For example, the rows and columns may be oriented at any angle relative to each other, may be oriented in a substantially horizontal plane or a substantially vertical plane, and/or may be oriented in a folded topology, among other possible three-dimensional configurations.

Memory cells can be coupled to different digit lines and word lines. For example, a first source/drain region of a transistor 502-1 can be coupled to digit line 505-1 (n), a second source/drain region of transistor 502-1 can be coupled to capacitor 503-1, and a gate of a transistor 502-1 can be coupled to word line 504-Y. A first source/drain region of a transistor 502-2 can be coupled to digit line 505-2 (n)_, a second source/drain region of transistor 502-2 can be coupled to capacitor 503-2, and a gate of a transistor 502-2 can be coupled to word line 504-X. A cell plate, as shown in FIG. 2, can be coupled to each of capacitors 503-1 and 503-2. The cell plate can be a common node to which a reference voltage (e.g., ground) can be applied in various memory array configurations.

The memory array 530 is configured to couple to sensing circuitry 550 in accordance with a number of embodiments of the present disclosure. In this embodiment, the sensing circuitry 550 comprises a sense amplifier 506 and a compute component 531 corresponding to respective columns of memory cells (e.g., coupled to respective pairs of complementary digit lines). The sense amplifier 506 can be coupled to the pair of complementary digit lines 505-1 (n) and 505-2 (n)_. The compute component 531 can be coupled to the sense amplifier 506 via pass gates 507-1 and 507-2. The gates of the pass gates 507-1 and 507-2 can be coupled to operation selection logic 513.

The operation selection logic 513 can be configured to include pass gate logic for controlling pass gates that couple the pair of complementary digit lines un-transposed between the sense amplifier 506 and the compute component 531 and swap gate logic for controlling swap gates that couple the pair of complementary digit lines transposed between the sense amplifier 506 and the compute component 531. The operation selection logic 513 can also be coupled to the pair of complementary digit lines 505-1 and 505-2. The operation selection logic 513 can be configured to control continuity of pass gates 507-1 and 507-2 based on a selected operation.

The sense amplifier 506 can be operated to determine a data value (e.g., logic state) stored in a selected memory cell. The sense amplifier 506 can comprise a cross coupled latch, which can be referred to herein as a primary latch. In the example illustrated in FIG. 5, the circuitry corresponding to sense amplifier 506 comprises a latch 515 including four transistors coupled to a pair of complementary digit lines 505-1 (n) and 505-2 (n)_. However, embodiments are not limited to this example. The latch 515 can be a cross coupled latch (e.g., gates of a pair of transistors) such as n-channel transistors (e.g., NMOS transistors) 527-1 and 527-2 are cross coupled with the gates of another pair of transistors, such as p-channel transistors (e.g., PMOS transistors) 529-1 and 529-2).

In operation, when a memory cell is being sensed (e.g., read), the voltage on one of the digit lines 505-1 (n) or 505-2 (n)_ will be slightly greater than the voltage on the other one of digit lines 505-1 (n) or 505-2 (n)_. An ACT signal and an RNL* signal can be driven low to enable (e.g., fire) the sense amplifier 506. The digit lines 505-1 (n) or 505-2 (n)_ having the lower voltage will turn on one of the PMOS transistor 529-1 or 529-2 to a greater extent than the other of PMOS transistor 529-1 or 529-2, thereby driving high the digit line 505-1 (n) or 505-2 (n)_having the higher voltage to a greater extent than the other digit line 505-1 (n) or 505-2 (n)_ is driven high.

Similarly, the digit line 505-1 (n) or 505-2 (n)_ having the higher voltage will turn on one of the NMOS transistor 527-1 or 527-2 to a greater extent than the other of the NMOS transistor 527-1 or 527-2, thereby driving low the digit line 505-1 (n) or 505-2 (n)_ having the lower voltage to a greater extent than the other digit line 505-1 (n) or 505-2 (n)_ is driven low. As a result, after a short delay, the digit line 505-1 (n) or 505-2 (n)_ having the slightly greater voltage is driven to the voltage of the supply voltage $V_{CC}$ through a source transistor, and the other digit line 505-1 (n) or 505-2 (n)_ is driven to the voltage of the reference voltage (e.g., ground) through a sink transistor. Therefore, the cross coupled NMOS transistors 527-1 and 527-2 and PMOS transistors 529-1 and 529-2 serve as a sense amplifier pair, which amplify the differential voltage on the digit lines 505-1 (n) and 505-2 (n)_ and operate to latch a data value sensed from the selected memory cell.

Embodiments are not limited to the sense amplifier 506 configuration illustrated in FIG. 5. As an example, the sense amplifier 506 can be a current-mode sense amplifier and a single-ended sense amplifier (e.g., sense amplifier coupled to one digit line). Also, embodiments of the present disclosure are not limited to a folded digit line architecture such as that shown in FIG. 5.

The sense amplifier 506 can, in conjunction with the compute component 531, be operated to perform various operations using data from an array as input. In a number of embodiments, the result of an operation can be stored back to the array without transferring the data via a digit line address access and/or moved between banks without using an external data bus (e.g., without firing a column decode signal such that data is transferred to circuitry external from the array and sensing circuitry via local I/O lines). As such, a number of embodiments of the present disclosure can enable performing operations and compute functions associated therewith using less power than various previous approaches. Additionally, since a number of embodiments eliminate the need to transfer data across local and global I/O lines and/or external data buses in order to perform compute functions (e.g., between memory and discrete processor), a number of embodiments can enable an increased (e.g., faster) processing capability as compared to previous approaches.

The sense amplifier 506 can further include equilibration circuitry 514, which can be configured to equilibrate the digit lines 505-1 (n) and 505-2 (n)_. In this example, the equilibration circuitry 514 comprises a transistor 524 coupled between digit lines 505-1 (n) and 505-2 (n)_. The equilibration circuitry 514 also comprises transistors 525-1 and 525-2 each having a first source/drain region coupled to an equilibration voltage (e.g., $V_{DD}/2$), where $V_{DD}$ is a supply voltage associated with the array. A second source/drain region of transistor 525-1 can be coupled digit line 505-1 (n), and a second source/drain region of transistor 525-2 can be coupled digit line 505-2 (n)_. Gates of transistors 524, 525-1, and 525-2 can be coupled together, and to an equilibration (EQ) control signal line 526. As such, activating EQ enables the transistors 524, 525-1, and 525-2, which effectively shorts digit lines 505-1 (n) and 505-2 (n)_ together and to the equilibration voltage (e.g., $V_{DD}/2$).

Although FIG. 5 shows sense amplifier 506 comprising the equilibration circuitry 514, embodiments are not so limited, and the equilibration circuitry 514 may be implemented discretely from the sense amplifier 506, implemented in a different configuration than that shown in FIG. 5, or not implemented at all.

As described further below, in a number of embodiments, the sensing circuitry 550 (e.g., sense amplifier 506 and compute component 531) can be operated to perform a selected operation and initially store the result in one of the sense amplifier 506 or the compute component 531 without transferring data from the sensing circuitry via a local or global I/O line and/or moved between banks without using an external data bus (e.g., without performing a sense line address access via activation of a column decode signal, for instance).

Performance of operations (e.g., Boolean logical operations involving data values) is fundamental and commonly used. Boolean logical operations are used in many higher level operations. Consequently, speed and/or power efficiencies that can be realized with improved operations, can translate into speed and/or power efficiencies of higher order functionalities.

As shown in FIG. 5, the compute component 531 can also comprise a latch, which can be referred to herein as a secondary latch 564. The secondary latch 564 can be configured and operated in a manner similar to that described above with respect to the primary latch 515, with the exception that the pair of cross coupled p-channel transistors (e.g., PMOS transistors) included in the secondary latch can have their respective sources coupled to a supply voltage (e.g., $V_{DD}$), and the pair of cross coupled n-channel transistors (e.g., NMOS transistors) of the secondary latch can have their respective sources selectively coupled to a reference voltage (e.g., ground), such that the secondary latch is continuously enabled. The configuration of the compute component 531 is not limited to that shown in FIG. 5, and various other embodiments are feasible.

As described herein, a memory device (e.g., 420 in FIG. 4A) can be configured to couple to a host (e.g., 410) via a data bus (e.g., 456) and a control bus (e.g., 454). A bank (e.g., 421) in the memory device can include a plurality of subarrays of memory cells. The bank 421 can include sensing circuitry (e.g., 450 in FIG. 4A and corresponding reference numbers in FIGS. 5 and 6) coupled to the plurality of subarrays via a plurality of columns (e.g., 605-1 and 605-2 in FIG. 6) of the memory cells. The sensing circuitry can include a sense amplifier and a compute component (e.g., 506 and 531, respectively, in FIG. 5) coupled to each of the columns.

The bank (e.g., 421 in FIG. 4B) can include a plurality of sensing component stripes each with sensing circuitry coupled to a respective subarray of the plurality of the subarrays. A controller (e.g., 440 in FIGS. 4A-4B) coupled to the bank can be configured to direct, as described herein, movement of data values stored in a first subarray (e.g., from data values in a row of the subarray sensed (cached) by the coupled sensing component stripe) to be stored in latches of a latch stripe and/or a cache (e.g., 470 in FIG. 4A). Moving (e.g., copying, transferring, and/or transporting) data values between sense amplifiers and/or compute components (e.g., 506 and 531, respectively, in FIG. 5) in a sensing component stripe and corresponding sense amplifiers and/or compute components that form latches in a latch stripe can be enabled by a number of selectably coupled shared I/O lines (e.g., 655 in FIG. 6) shared by the sensing component stripe and the latch stripe, as described herein.

The memory device can include a sensing component stripe configured to include a number of a plurality of sense amplifiers and compute components (e.g., 606-0, 606-1, . . . , 606-7 and 631-0, 631-1, . . . , 631-7, respectively, as shown in FIG. 6) that can correspond to a number of the plurality of columns (e.g., 605-1 and 605-2 in FIG. 6) of the memory cells, where the number of sense amplifiers and/or compute components can be selectably coupled to the plurality of shared I/O lines (e.g., via column select circuitry 658-1 and 658-2 in FIG. 6). The column select circuitry can be configured to selectably sense data in a particular column of memory cells of a subarray by being selectably coupled to a plurality of (e.g., four, eight, and sixteen, among other possibilities) sense amplifiers and/or compute components.

In some embodiments, a number of a plurality of sensing component stripes in the bank can correspond to a number of the plurality of subarrays in the bank. A sensing component stripe can include a number of sense amplifiers and/or compute components configured to move (e.g., copy, transfer, and/or transfer) an amount of data sensed from a row of the first subarray in parallel to a plurality of shared I/O lines. In some embodiments, the amount of data can correspond to at least a thousand bit width of the plurality of shared I/O lines.

As described herein, the array of memory cells can include an implementation of DRAM memory cells where the controller is configured, in response to a command, to move (e.g., copy, transfer, and/or transfer) data from the source location to the destination location via a shared I/O line. In various embodiments, the source location can be in a first bank and the destination location can be in a second bank in the memory device and/or the source location can be in a first subarray of one bank in the memory device and the destination location can be in a second subarray of a different bank. The first subarray and the second subarray can be in the same section of the bank or the subarrays can be in different sections of the bank.

As described herein, the apparatus can be configured to move (e.g., copy, transfer, and/or transfer) data from a source location, including a particular row (e.g., 619 in FIG. 6) and column address associated with a first number of sense amplifiers and compute components) to a shared I/O line. In addition, the apparatus can be configured to move the data to a destination location, including a particular row and column address associated with a second number of sense amplifiers and compute components using the shared I/O line (e.g., 655 in FIG. 6). As the reader will appreciate, each shared I/O line (e.g., 655) can actually include a complementary pair of shared I/O lines (e.g., shared I/O line and shared I/O line* as shown in the example configuration of FIG. 6). In some embodiments described herein, 2048 shared I/O lines (e.g., complementary pairs of shared I/O lines) can be configured as a 2048 bit wide shared I/O line.

FIG. 6 is a schematic diagram illustrating circuitry for data transfer in a memory device in accordance with a number of embodiments of the present disclosure.

FIG. 6 shows eight sense amplifiers (e.g., sense amplifiers 0, 1, . . . , 7 shown at 606-0, 606-1, . . . , 606-7, respectively) each coupled to a respective pair of complementary sense lines (e.g., digit lines 605-1 and 605-2). FIG. 6 also shows eight compute components (e.g., compute components 0, 1, . . . , 7 shown at 631-0, 631-1, . . . , 631-7) each coupled to a respective sense amplifier (e.g., as shown for sense amplifier 0 at 606-0) via respective pass gates 607-1 and 607-2 and digit lines 605-1 and 605-2. For example, the pass gates can be connected as shown in FIG. 5 and can be controlled by an operation selection signal, Pass. For example, an output of the selection logic can be coupled to the gates of the pass gates 607-1 and 607-2 and digit lines 605-1 and 605-2. Corresponding pairs of the sense amplifiers and compute components can contribute to formation of the sensing circuitry indicated at 650-0, 650-1, . . . , 650-7.

Data values present on the pair of complementary digit lines 605-1 and 605-2 can be loaded into the compute component 631-0 as described in connection with FIG. 5. For example, when the pass gates 607-1 and 607-2 are enabled, data values on the pair of complementary digit lines 605-1 and 605-2 can be passed from the sense amplifiers to the compute component (e.g., 606-0 to 631-0). The data values on the pair of complementary digit lines 605-1 and 605-2 can be the data value stored in the sense amplifier 606-0 when the sense amplifier is fired.

The sense amplifiers 606-0, 606-1, . . . , 606-7 in FIG. 6 can each correspond to sense amplifier 506 shown in FIG. 5. The compute components 631-0, 631-1, . . . , 631-7 shown in FIG. 6 can each correspond to compute component 531 shown in FIG. 5. A combination of one sense amplifier with one compute component can contribute to the sensing circuitry (e.g., 650-0, 650-1, . . . , 650-7) of a portion of a DRAM memory subarray 625 configured to an I/O line 655 shared by a number of sensing component stripes for subarrays and/or latch components, as described herein. The paired combinations of the sense amplifiers 606-0, 606-1, . . . , 606-7 and the compute components 631-0, 631-1, . . . , 361-7, shown in FIG. 6, can be included in the sensing component stripe.

The configurations of embodiments illustrated in FIG. 6 are shown for purposes of clarity and are not limited to these configurations. For instance, the configuration illustrated in FIG. 6 for the sense amplifiers 606-0, 606-1, . . . , 606-7 in combination with the compute components 631-0, 631-1, . . . , 631-7 and the shared I/O line 655 is not limited to half the combination of the sense amplifiers 606-0, 606-1, . . . , 606-7 with the compute components 631-0, 631-1, . . . , 631-7 of the sensing circuitry being formed above the columns 622 of memory cells (not shown) and half being formed below the columns 622 of memory cells. Nor are the number of such combinations of the sense amplifiers with the compute components forming the sensing circuitry configured to couple to a shared I/O line limited to eight. In addition, the configuration of the shared I/O line 655 is not limited to being split into two for separately coupling each of the two sets of complementary digit lines 605-1 and 605-2, nor is the positioning of the shared I/O line 655 limited to being in the middle of the combination of the sense amplifiers and the compute components forming the sensing circuitry (e.g., rather than being at either end of the combination of the sense amplifiers and the compute components).

The circuitry illustrated in FIG. 6 also shows column select circuitry 658-1 and 658-2 that is configured to implement data movement operations with respect to particular columns 622 of a subarray 625, the complementary digit lines 605-1 and 605-2 associated therewith, and the shared I/O line 655 (e.g., as directed by the controller 140 shown in FIG. 1). For example, column select circuitry 658-1 has select lines 0, 2, 4, and 6 that are configured to couple with corresponding columns, such as column 0 (332-0), column 2, column 4, and column 6. Column select circuitry 658-2 has select lines 1, 3, 5, and 7 that are configured to couple with corresponding columns, such as column 1, column 3, column 5, and column 7.

Controller 140 can be coupled to column select circuitry 658 to control select lines (e.g., select line 0) to access data values stored in the sense amplifiers, compute components, and/or present on the pair of complementary digit lines (e.g., 605-1 and 605-2 when selection transistors 659-1 and 659-2 are activated via signals from select line 0). Activating the selection transistors 659-1 and 659-2 (e.g., as directed by the controller 140) enables coupling of sense amplifier 606-0, compute component 631-0, and/or complementary digit lines 605-1 and 605-2 of column 0 (622-0) to move data values on digit line 0 and digit line 0* to shared I/O line 655. For example, the moved data values may be data values from a particular row 619 stored (cached) in sense amplifier 606-0 and/or compute component 631-0. Data values from each of columns 0 through 7 can similarly be selected by controller 140 activating the appropriate selection transistors.

Moreover, enabling (e.g., activating) the selection transistors (e.g., selection transistors 659-1 and 659-2) can enable a particular sense amplifier and/or compute component (e.g., 606-0 and/or 631-0, respectively) to be coupled with a shared I/O line 655 such that data values stored by an amplifier and/or compute component can be moved to (e.g., placed on and/or transferred to) the shared I/O line 655. In some embodiments, one column at a time is selected (e.g., column 622-0) to be coupled to a particular shared I/O line 655 to move (e.g., copy, transfer, and/or transport) the stored data values. In the example configuration of FIG. 6, the shared I/O line 655 is illustrated as a shared, differential I/O line pair (e.g., shared I/O line and shared I/O line*). Hence, selection of column 0 (622-0) could yield two data values (e.g., two bits with values of 0 and/or 1) from a row (e.g., row 619) and/or as stored in the sense amplifier and/or compute component associated with complementary digit lines 605-1 and 605-2. These data values could be input in parallel to each shared, differential I/O pair (e.g., shared I/O and shared I/O*) of the shared differential I/O line 655.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a cache coupled to an array of memory cells and sensing circuitry configured to perform logical operations on data stored in the array, and a host; and
   a controller coupled to the cache, the array, the sensing circuitry, and the host, the controller configured to:
   perform a read operation beginning at a first physical address of the cache to transfer data from the array to the cache, wherein the first physical address of the cache is neither an initial address of the cache nor a final address of the cache;
   execute a read plus retrieve command to initiate a concurrent transfer of data from the array to the cache and from the cache to the host; and
   perform a transfer operation concurrently with the read operation, the transfer operation to transfer data from the cache to the host, wherein the transfer begins at a second physical address of the cache that is neither an initial address of the cache nor a final address of the cache, and wherein the second physical address of the cache is located in a physical address location preceding the first address of the cache.

2. The apparatus of claim 1, wherein the read operation has a first transfer rate associated therewith and the transfer operation has a second transfer rate associated therewith.

3. The apparatus of claim 1, wherein the controller is configured to cause data to be transferred from the cache to a data bus.

4. The apparatus of claim 1, wherein the first address is a column address.

5. The apparatus of claim 1, wherein the first address of the cache is chosen based, at least in part, on a mode register setting.

6. The apparatus of claim 1, wherein the controller is further configured to select the first address of the array.

7. The apparatus of claim 1, wherein the controller is further configured to provide a command to the cache, and wherein the command includes the first address and a command to perform the first read operation.

8. The apparatus of claim 1, wherein the controller is configured to provide a write commit command to an address adjacent to the first address.

9. The apparatus of claim 1, wherein the first address and the second address are not adjacent to one another.

10. The apparatus of claim 1, wherein the controller is further configured to perform the read operation concurrently with performing a second read operation at a third physical address of the array of memory cells to transfer data to the cache.

11. An apparatus, comprising:
    an array of memory cells coupled to sensing circuitry including a sense amplifier and a compute component, the sensing circuitry configured to perform logical operation on data stored in the array;
    a cache comprising a plurality of physical addresses starting with an initial address and ending with a final address, the cache coupled to the array of memory cells; and a controller coupled to a plurality of registers and the array, wherein the controller is configured to:
  transfer a first block of data from a first address of the array to a first address of the cache during a first time period, wherein the first address is neither the initial address of the cache nor the final address of the cache;
  transfer a second block of data from a second address of the array to a second address of the cache during a second time period, wherein the second address is adjacent to the first address;
  execute a read plus retrieve command to initiate a concurrent transfer of data from the array to the cache and from the cache to the host; and
  subsequent to execution of the read plus retrieve command, transfer a portion of the first block of data from the first address of the cache to a host coupled to a data bus during the second time period.

12. The apparatus of claim 11, wherein the controller comprises a bank processing control unit.

13. The apparatus of claim 11, wherein the cache comprises at least one latch.

14. The apparatus of claim 11, wherein the cache comprises an input/output (I/O) cache.

15. The apparatus of claim 11, wherein the controller is further configured to transfer the portion of the first data from the cache to at least one DQ pin associated with the data bus.

16. The apparatus of claim 11, wherein the data bus couples the array of memory cells together.

17. An apparatus, comprising:
  a host coupled to an interface;
  a register communicatively coupled to the interface; and
  a controller coupled to the host and the register, wherein the controller is configured to:
    control writing data from the host to a cache;
    execute a write plus commit command to initiate a concurrent transfer of data from the array to the cache and from the cache to the host; and
    control writing the data from a first physical address of the cache to an array of memory cells while data is concurrently written from the host to a second physical address of the cache, wherein the first address of the cache and the second address of the cache are neither an initial address of the cache nor a final address of the cache and wherein the second address of the cache is located in a physical address location preceding the first address of the cache.

18. The apparatus of claim 17, wherein the controller is further configured to control writing data from the cache to an array of memory cells concurrently with writing the subsequent data to the cache.

19. The apparatus of claim 17, wherein the register comprises a mode register.

20. The apparatus of claim 17, wherein the controller is further configured to control writing data from the cache to an array of memory cells in response to the data being written to the cache.

21. A method, comprising:
  transferring data from an array of memory cells to a cache beginning at a first physical address, wherein the cache is coupled to sensing circuitry configured to perform logical operations on data stored in the array, and wherein the cache comprises a plurality of physical addresses starting at an initial address and ending at a final address, and wherein the first address is neither the initial address of the cache nor the final address of the cache;
  executing a read plus retrieve command to initiate a concurrent transfer of data from the array to the cache and from the cache to the host;
  reading the data out of the cache to a host computing device in response to execution of the read plus retrieve command beginning at a second address, wherein the second address is neither the initial address of the cache nor the final address of the cache;
  determining that data has been transferred from the array to the final address of the cache; and
  transferring data from the array to the cache beginning at the initial address.

22. The method of claim 21, further comprising reading the data from the cache in response to completion of the data transferring from a first address of the array of memory cells to a first address of the cache.

23. The method of claim 21, further comprising reading the data from the first address of the cache before all the data is transferred from the array of memory cells.

24. The method of claim 21, further comprising receiving a starting column address information to identify a starting address associated with the array of memory cells, wherein the starting address of the array of memory cells is an address from which the data will start being transferred.

25. The method of claim 24, further comprising latching the starting column address information to the cache with an external command.

* * * * *